US007035466B2

(12) United States Patent
Akel et al.

(10) Patent No.: US 7,035,466 B2
(45) Date of Patent: Apr. 25, 2006

(54) PROCESS AND DEVICE FOR DETECTION OF STRAIGHT-LINE SEGMENTS IN A STREAM OF DIGITAL DATA THAT ARE REPRESENTATIVE OF AN IMAGE IN WHICH THE CONTOUR POINTS OF SAID IMAGE ARE IDENTIFIED

(75) Inventors: Khalid El Akel, Castanet (FR); Christophe Dumontier, Castanet (FR); Patrick Reuze, Toulouse (FR); Serge Thuries, Saint Jean (FR); Jean-Michel Puech, Toulouse (FR); Jean-Louis Massieu, Montauban (FR)

(73) Assignee: Intermec IP Corp., Woodland Hills, CA (US)

( * ) Notice: Subject to any disclaimer, the term of this patent is extended or adjusted under 35 U.S.C. 154(b) by 266 days.

(21) Appl. No.: 10/668,765

(22) Filed: Sep. 23, 2003

(65) Prior Publication Data

US 2004/0057620 A1 Mar. 25, 2004

Related U.S. Application Data

(62) Division of application No. 09/490,626, filed on Jan. 24, 2000, now Pat. No. 6,687,403.

(30) Foreign Application Priority Data

Jan. 22, 1999 (FR) .................................. 99 00718

(51) Int. Cl.
*G06K 9/46* (2006.01)

(52) U.S. Cl. ...................... 382/201; 382/199; 382/204; 382/197

(58) Field of Classification Search ................ 382/194, 382/201, 147, 204
See application file for complete search history.

(56) References Cited

U.S. PATENT DOCUMENTS

| 4,567,610 | A | 1/1986 | McConnell | 382/18 |
| 5,301,115 | A | 4/1994 | Nouso | 364/460 |
| 5,378,881 | A | 1/1995 | Adachi | 235/462 |
| 5,471,550 | A | 11/1995 | Kurachi | 382/200 |
| 5,703,963 | A | 12/1997 | Kojima et al. | 382/197 |
| 6,434,270 | B1 | 8/2002 | Ohara et al. | 382/178 |
| 2005/0117781 | A1* | 6/2005 | Aoyama | 382/103 |

FOREIGN PATENT DOCUMENTS

WO 92/11609 7/1992

OTHER PUBLICATIONS

Abdallah, Cherri K. and Mohammad A. Karim, "Optical Symbolic Substitution: Edge Detection Using Prewitt, Sobel, and Roberts Operators," Applied Optics, vol. 28, No. 21, Nov. 1989, pp. 4644-4648.

Hemdal, John F., "One-Dimensional Digital Processing of Images for Straigh-Line Detection," Pattern Recognition, vol. 31, No. 11, pp. 1687-1690.

* cited by examiner

*Primary Examiner*—Andrew W. Johns
*Assistant Examiner*—Patrick L. Edwards
(74) *Attorney, Agent, or Firm*—Seed IP Law Group PLLC

(57) ABSTRACT

A process for detection of straight-line segments in a stream of digital data that are representative of an image (m, n) in which the contour points of said image each defined by the modulus and the orientation θ of their gradient in relation to a horizontal axis are identified. The stream of digital data is stored in the form of two successive lines, each of n points P(i, j), for each of the lines the n points of said line are extracted successively, and for each point Pc(i, j) extracted, the so-called current point, the three points having inferior coordinates Pa(i−1, j−1), Pb(i, j−1), Pd(i−1, j) directly neighboring said current point are extracted, successively the value of the orientation of the current point Pc is compared with that of the neighboring points Pa, Pb and Pd. The values of the orientations of the points Pb and Pd are compared, the result of a comparison is validated if the points are contour points and if the values of their orientation are close. Moreover, when the result of a comparison is validated the coordinates of the point of the connection having inferior coordinates are copied over to those of the point having superior coordinates, it is verified whether solely the point Pa(i−1, j−1) is a contour point amongst the four points Pa, Pb, Pc, Pd extracted, and in the affirmative case the coordinates of the origin point and of the final point and the orientation of the straight-line segment, if its size is greater than a predetermined threshold, are saved.

9 Claims, 4 Drawing Sheets

PROCESS AND DEVICE FOR DETECTION OF STRAIGHT-LINE SEGMENTS IN A STREAM OF DIGITAL DATA THAT ARE REPRESENTATIVE OF AN IMAGE IN WHICH THE CONTOUR POINTS OF SAID IMAGE ARE IDENTIFIED

CROSS-REFERENCE TO RELATED APPLICATION

This application is a divisional and claims the benefit of U.S. patent application Ser. No. 09/490,626 filed Jan. 24, 2000 (now U.S. Pat. No. 6,687,403), where this application is incorporated herein by reference in its entirety.

TECHNICAL FIELD

The invention generally relates to the field of image recognition.

BACKGROUND OF THE INVENTION

Image recognition is important in many fields, including automatic data collection, for example bar code reading. The ability to capture image data at higher resolutions leads to a need for faster processing of the captured image data.

SUMMARY OF THE INVENTION

Some aspects of the invention concern a process for detection of straight-line segments in a stream of digital data that are representative of an image having dimension (m, n) and size T=m×n, in which the contour points of said image each defined by the modulus and the orientation of their gradient in relation to a horizontal axis are identified. It extends to a device for detection of straight-line segments for implementing this detection process.

In one aspect, a process for detection of straight-line segments can permit processing of the digital data that are representative of a high-resolution image at a very elevated rate, supplying the start and end coordinates and the orientation of each of said straight-line segments.

Such a process is applied, in particular, for the detection of straight-line segments in a stream of digital data that are representative of images of codes in one and two dimensions which are formed on an electronic sensor such as a photosensitive matrix. To this end, the process may be implemented in a detection device which is integrated within a processing submodule forming an image acquisition and processing subassembly to process images of codes which are formed on a photosensitive matrix, such as described in the French patent application (French Serial No. 99.00717 filed on Jan. 22, 1999) filed in the name of the applicant, the processing submodule can employ cabled processing units comprising, upstream of said detection device:

- a replicate-sampling circuit capable of reducing the size T of the image formed on the photosensitive matrix, for example by dividing said size T in accordance with the pyramidal method of BURT so as to obtain an image of reduced size T/4 and then T/16; and
- a contour detection circuit to detect the contours in the reduced image emitted from the replicate-sampling circuit, adapted to supply images of said contours in which the contour points are defined by the modulus and the orientation of their gradient in relation to a horizontal axis, where the gradient represents the magnitude of the contrast between two points. These contour points are determined, for example, by calculating the gradients by application of the masks method of ROBERTS in the horizontal and vertical directions and by retaining as contour points the sole points for which the modulus of the gradient is greater than a predetermined threshold and maximal in the direction of said gradient which is defined by the argument of the latter, the other points being considered as not pertaining to a contour and being identified, for example, by a value such as −1 of the orientation of their gradient.

Another aspect of the invention provides, for each image, a histogram of the orientations of the various straight-line segments detected.

The process for detection of straight-line segments according to the invention can be characterized in that the stream of digital data is stored in the form of two successive lines, each of n points $P(i,j)$, with $1 \leq i \leq m$ and $1 \leq j \leq n$, and for each of the lines the n points of said line are extracted successively, and for each point $Pc(i,j)$ extracted, the so-called current point:

the three points having inferior coordinates $Pa(i-1, j-1)$, $Pb(i, j-1)$, $Pd(i-1, j)$ directly neighbouring said current point are extracted, successively the value of the orientation of the gradient of the current point Pc are compared with that of the neighbouring points Pa, Pb and Pd, and the values of the orientations of the gradients of the points Pb and Pd are compared, the result of a comparison, representative of a connection between two points, is validated if said points are contour points and if the difference between the values of the orientation of their gradient is less than or equal to a predetermined value k, when the result of a comparison is validated the coordinates of the point of the connection having inferior coordinates, the so-called start-point, are copied over to those of the point of said connection having superior coordinates, the so-called end-point, and the coordinates of the start-point are erased from the memory, unless said start-point has been identified as being an origin point of a straight-line segment.

it is verified whether solely the point Pa $(i-1, j-1)$ is a contour point amongst the four points Pa, Pb, Pc, Pd extracted, and in the affirmative case the size of the straight-line segment for which said point Pa is the final point is calculated and the coordinates of the origin point and of the final point and the orientation of said straight-line segment, if its size is greater than a predetermined threshold, are saved.

This process therefore operates on the basis of line memories corresponding to successive lines of the image and permitting the whole of said image to be scanned from top to bottom, said memories on the one hand containing the result of the detection of contours, that is to say, for each point the value of the orientation of its gradient (equal to a given value if the point is a contour point and to −1 in the contrary case), and on the other hand serving to write the coordinates of the extremities, the origin point and final point, and the orientation of the straight-line segments.

Moreover, the obtaining of a series of straight-lines segments from a contour consists in following this contour from the "highest" point as far as the "lowest" point thereof and in deciding, firstly, for each point $P(i,j)$ containing a contour, whether P pertains to a neighbouring segment S, itself constituted by one or more contour points. Then if P pertains to the segment S the final extremity of this segment takes as its coordinates those of P, that is to say $(i,j)$, the origin extremity of said segment remaining unchanged and the coordinates of the possible intermediate points being erased. On the other hand, if P does not pertain to this segment it then defines the origin of a new segment, the two extremities of which are equal to (i,j), the size of which is equal to 1 and the orientation of which is θ,P.

Such a detection process may permit processing at a higher rate—equivalent, for example, to the pixel frequency at which data that are representative of images are supplied by a photosensitive matrix—of the digital data that are representative of the contours of high-resolution images.

According to a particular embodiment which is directed towards the processing of horizontal or substantially horizontal straight-line segments:

at the time of the validation of a first connection between two neighbouring points P(i−1, j), P(i,j) pertaining to the same line, representative of an initial horizontal straight-line segment, the coordinates of the start-point of the connection are replaced by those of the end-point of said connection, and conversely those of the end-point are replaced by those of the start-point.

then, for any point P(i+x,j) pertaining to said line, connected to the initial straight-line segment, the coordinates of said point are replaced by the initial coordinates (i−1,j) of the origin point of the initial horizontal straight-line segment and the coordinates of said origin point are replaced by those (i+x,j) of said point.

Moreover, and in advantageous manner, at the time of the validation of the connection between a point P(i,j) with a point P(i−1, j−1) or P(i+1, j−1) validated as an extremity point, origin or final, of a horizontal straight-line segment, the coordinates of said point P(i,j) are transferred to those of the opposing extremity point, final or origin, of said straight-line segment, and those of said opposing extremity point are transferred to those of said point P(i,j).

According to these measures, in the case of horizontal or substantially horizontal straight-line segments the two extremities of said segments are revealed, for said extremities are both susceptible of being connected to another segment of a size greater than or equal to one which is processed in the following line. For this reason the process according to the invention permits two horizontal segments to be connected, the coordinates of the neighbouring extremities of these segments being erased, whereas the coordinates of the opposing extremities of said segments are transferred reciprocally from one extremity to the other.

Moreover, the process likewise permits a horizontal straight-line segment to be connected with a contour point, the coordinates of said contour point and those of the extremity of the straight-line segment opposing said contour point being transferred in reciprocal manner.

Furthermore, the histogram of the orientations of the various straight-line segments detected in the image is advantageously calculated.

By way of example, such a histogram of the orientations presents interest, in particular, in the case of the reading of codes in one dimension which are composed of parallel bars, for it then exhibits a peak corresponding to the value θ of the angle between the horizontal and the axis of said parallel bars. For this reason, data that are i representative of the code are easily obtained by performing a "reading" of said code along a line which is orthogonal to that defined by the angle θ.

Such a histogram also presents interest within the context of two-dimensional codes exhibiting a specific signature such as, for example, the codes DATAMATRIX delimited by two straight orthogonal lines of the same length. In this case, such a code is easily identified by verification of the following two hypotheses: sizes of the two identical straight-line segments and difference of the values of the orientations corresponding to the peaks of the histogram substantially equal to 90°.

According to another characteristic of the invention, the contour points of the initial image (m, n) are defined by values of the orientation of the gradient amounting to between 0 and 15 which are obtained by a division of the trigonometric circle into 16 equal sectors and which are each representative of an angular position within one of said sectors.

Furthermore, on the basis of these values a connection is preferentially validated between two contour points by means of the following table:

| | | | | | | | | | | | | | | | | θ1 | | | | | | | | | | | | | | |
|---|---|---|---|---|---|---|---|---|---|---|---|---|---|---|---|---|---|---|---|---|---|---|---|---|---|---|---|---|---|---|
| θ2 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
| 0 | 00 | 16 | 32 | −1 | −1 | −1 | −1 | −1 | −1 | −1 | −1 | −1 | −1 | −1 | 46 | 31 | 16 | 32 | −1 | −1 | −1 | −1 | −1 | −1 | −1 | −1 | −1 | −1 | −1 | −1 |
| 1 | 16 | 01 | 17 | 33 | −1 | −1 | −1 | −1 | −1 | −1 | −1 | −1 | −1 | −1 | −1 | 47 | 16 | 17 | 33 | −1 | −1 | −1 | −1 | −1 | −1 | −1 | −1 | −1 | −1 | −1 |
| 2 | 32 | 17 | 02 | 18 | 34 | −1 | −1 | −1 | −1 | −1 | −1 | −1 | −1 | −1 | −1 | −1 | 32 | 17 | 18 | 34 | −1 | −1 | −1 | −1 | −1 | −1 | −1 | −1 | −1 | −1 |
| 3 | −1 | 33 | 18 | 03 | 19 | 35 | −1 | −1 | −1 | −1 | −1 | −1 | −1 | −1 | −1 | −1 | −1 | 33 | 18 | 19 | 35 | −1 | −1 | −1 | −1 | −1 | −1 | −1 | −1 | −1 |
| 4 | −1 | −1 | 34 | 19 | 04 | 20 | 36 | −1 | −1 | −1 | −1 | −1 | −1 | −1 | −1 | −1 | −1 | −1 | 34 | 19 | 20 | 36 | −1 | −1 | −1 | −1 | −1 | −1 | −1 | −1 |
| 5 | −1 | −1 | −1 | 35 | 20 | 05 | 21 | 37 | −1 | −1 | −1 | −1 | −1 | −1 | −1 | −1 | −1 | −1 | −1 | 35 | 20 | 21 | 37 | −1 | −1 | −1 | −1 | −1 | −1 | −1 |
| 6 | −1 | −1 | −1 | −1 | 36 | 21 | 06 | 22 | 38 | −1 | −1 | −1 | −1 | −1 | −1 | −1 | −1 | −1 | −1 | −1 | 36 | 21 | 22 | 38 | −1 | −1 | −1 | −1 | −1 | −1 |
| 7 | −1 | −1 | −1 | −1 | −1 | 37 | 22 | 07 | 23 | 39 | −1 | −1 | −1 | −1 | −1 | −1 | −1 | −1 | −1 | −1 | −1 | 37 | 22 | 23 | 39 | −1 | −1 | −1 | −1 | −1 |
| 8 | −1 | −1 | −1 | −1 | −1 | −1 | 38 | 23 | 08 | 24 | 40 | −1 | −1 | −1 | −1 | −1 | −1 | −1 | −1 | −1 | −1 | −1 | 38 | 23 | 24 | 40 | −1 | −1 | −1 | −1 |
| 9 | −1 | −1 | −1 | −1 | −1 | −1 | −1 | 39 | 24 | 09 | 25 | 41 | −1 | −1 | −1 | −1 | −1 | −1 | −1 | −1 | −1 | −1 | −1 | 39 | 24 | 25 | 41 | −1 | −1 | −1 |
| 10 | −1 | −1 | −1 | −1 | −1 | −1 | −1 | −1 | 40 | 25 | 10 | 26 | 42 | −1 | −1 | −1 | −1 | −1 | −1 | −1 | −1 | −1 | −1 | −1 | 40 | 25 | 26 | 42 | −1 | −1 |
| 11 | −1 | −1 | −1 | −1 | −1 | −1 | −1 | −1 | −1 | 41 | 26 | 11 | 27 | 43 | −1 | −1 | −1 | −1 | −1 | −1 | −1 | −1 | −1 | −1 | −1 | 41 | 26 | 27 | 43 | −1 |
| 12 | −1 | −1 | −1 | −1 | −1 | −1 | −1 | −1 | −1 | −1 | 42 | 27 | 12 | 28 | 44 | −1 | −1 | −1 | −1 | −1 | −1 | −1 | −1 | −1 | −1 | −1 | 42 | 27 | 28 | 44 |
| 13 | −1 | −1 | −1 | −1 | −1 | −1 | −1 | −1 | −1 | −1 | −1 | 43 | 28 | 13 | 29 | 45 | −1 | −1 | −1 | −1 | −1 | −1 | −1 | −1 | −1 | −1 | −1 | 43 | 28 | 29 |
| 14 | 46 | −1 | −1 | −1 | −1 | −1 | −1 | −1 | −1 | −1 | −1 | −1 | 44 | 29 | 14 | 30 | −1 | −1 | −1 | −1 | −1 | −1 | −1 | −1 | −1 | −1 | −1 | −1 | 44 | 29 |
| 15 | 31 | 47 | −1 | −1 | −1 | −1 | −1 | −1 | −1 | −1 | −1 | −1 | −1 | 45 | 30 | 15 | 47 | −1 | −1 | −1 | −1 | −1 | −1 | −1 | −1 | −1 | −1 | −1 | −1 | 45 |
| 16 | 16 | 16 | 32 | −1 | −1 | −1 | −1 | −1 | −1 | −1 | −1 | −1 | −1 | −1 | 47 | 16 | 32 | −1 | −1 | −1 | −1 | −1 | −1 | −1 | −1 | −1 | −1 | −1 | −1 | −1 |
| 17 | 32 | 17 | 17 | 33 | −1 | −1 | −1 | −1 | −1 | −1 | −1 | −1 | −1 | −1 | −1 | 32 | 17 | 33 | −1 | −1 | −1 | −1 | −1 | −1 | −1 | −1 | −1 | −1 | −1 | −1 |
| 18 | −1 | 33 | 18 | 18 | 34 | −1 | −1 | −1 | −1 | −1 | −1 | −1 | −1 | −1 | −1 | −1 | −1 | 33 | 18 | 34 | −1 | −1 | −1 | −1 | −1 | −1 | −1 | −1 | −1 | −1 |
| 19 | −1 | −1 | 34 | 19 | 19 | 35 | −1 | −1 | −1 | −1 | −1 | −1 | −1 | −1 | −1 | −1 | −1 | −1 | 34 | 19 | 35 | −1 | −1 | −1 | −1 | −1 | −1 | −1 | −1 | −1 |
| 20 | −1 | −1 | −1 | 35 | 20 | 20 | 36 | −1 | −1 | −1 | −1 | −1 | −1 | −1 | −1 | −1 | −1 | −1 | −1 | 35 | 20 | 36 | −1 | −1 | −1 | −1 | −1 | −1 | −1 | −1 |
| 21 | −1 | −1 | −1 | −1 | 36 | 21 | 21 | 37 | −1 | −1 | −1 | −1 | −1 | −1 | −1 | −1 | −1 | −1 | −1 | −1 | 36 | 21 | 37 | −1 | −1 | −1 | −1 | −1 | −1 | −1 |
| 22 | −1 | −1 | −1 | −1 | −1 | 37 | 22 | 22 | 38 | −1 | −1 | −1 | −1 | −1 | −1 | −1 | −1 | −1 | −1 | −1 | −1 | 37 | 22 | 38 | −1 | −1 | −1 | −1 | −1 | −1 |

-continued

| | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| 23 | −1 | −1 | −1 | −1 | −1 | −1 | 38 | 23 | 23 | 39 | −1 | −1 | −1 | −1 | −1 | −1 | −1 | −1 | −1 | −1 | −1 | −1 | 38 | 23 | 39 | −1 | −1 | −1 | −1 | −1 |
| 24 | −1 | −1 | −1 | −1 | −1 | −1 | −1 | 39 | 24 | 24 | 40 | −1 | −1 | −1 | −1 | −1 | −1 | −1 | −1 | −1 | −1 | −1 | −1 | 39 | 24 | 40 | −1 | −1 | −1 | −1 |
| 25 | −1 | −1 | −1 | −1 | −1 | −1 | −1 | −1 | 40 | 25 | 25 | 41 | −1 | −1 | −1 | −1 | −1 | −1 | −1 | −1 | −1 | −1 | −1 | −1 | 40 | 25 | 41 | −1 | −1 | −1 |
| 26 | −1 | −1 | −1 | −1 | −1 | −1 | −1 | −1 | −1 | 41 | 26 | 26 | 42 | −1 | −1 | −1 | −1 | −1 | −1 | −1 | −1 | −1 | −1 | −1 | −1 | 41 | 26 | 42 | −1 | −1 |
| 27 | −1 | −1 | −1 | −1 | −1 | −1 | −1 | −1 | −1 | −1 | 42 | 27 | 27 | 43 | −1 | −1 | −1 | −1 | −1 | −1 | −1 | −1 | −1 | −1 | −1 | −1 | 42 | 27 | 43 | −1 |
| 28 | −1 | −1 | −1 | −1 | −1 | −1 | −1 | −1 | −1 | −1 | −1 | 43 | 28 | 28 | 44 | −1 | −1 | −1 | −1 | −1 | −1 | −1 | −1 | −1 | −1 | −1 | −1 | 43 | 28 | 44 |
| 29 | −1 | −1 | −1 | −1 | −1 | −1 | −1 | −1 | −1 | −1 | −1 | −1 | 44 | 29 | 29 | 45 | −1 | −1 | −1 | −1 | −1 | −1 | −1 | −1 | −1 | −1 | −1 | −1 | 44 | 29 |
| 30 | 46 | −1 | −1 | −1 | −1 | −1 | −1 | −1 | −1 | −1 | −1 | −1 | −1 | 45 | 30 | 30 | −1 | −1 | −1 | −1 | −1 | −1 | −1 | −1 | −1 | −1 | −1 | −1 | −1 | 45 |
| 31 | 31 | 47 | −1 | −1 | −1 | −1 | −1 | −1 | −1 | −1 | −1 | −1 | −1 | −1 | 46 | 31 | 47 | −1 | −1 | −1 | −1 | −1 | −1 | −1 | −1 | −1 | −1 | −1 | −1 | −1 |
| 32 | 32 | 32 | 32 | −1 | −1 | −1 | −1 | −1 | −1 | −1 | −1 | −1 | −1 | −1 | −1 | 32 | 32 | −1 | −1 | −1 | −1 | −1 | −1 | −1 | −1 | −1 | −1 | −1 | −1 | −1 |
| 33 | −1 | 33 | 33 | 33 | −1 | −1 | −1 | −1 | −1 | −1 | −1 | −1 | −1 | −1 | −1 | −1 | 33 | 33 | −1 | −1 | −1 | −1 | −1 | −1 | −1 | −1 | −1 | −1 | −1 | −1 |
| 34 | −1 | −1 | 34 | 34 | 34 | −1 | −1 | −1 | −1 | −1 | −1 | −1 | −1 | −1 | −1 | −1 | −1 | 34 | 34 | −1 | −1 | −1 | −1 | −1 | −1 | −1 | −1 | −1 | −1 | −1 |
| 35 | −1 | −1 | −1 | 35 | 35 | 35 | −1 | −1 | −1 | −1 | −1 | −1 | −1 | −1 | −1 | −1 | −1 | −1 | 35 | 35 | −1 | −1 | −1 | −1 | −1 | −1 | −1 | −1 | −1 | −1 |
| 36 | −1 | −1 | −1 | −1 | 36 | 36 | 36 | −1 | −1 | −1 | −1 | −1 | −1 | −1 | −1 | −1 | −1 | −1 | −1 | 36 | 36 | −1 | −1 | −1 | −1 | −1 | −1 | −1 | −1 | −1 |
| 37 | −1 | −1 | −1 | −1 | −1 | 37 | 37 | 37 | −1 | −1 | −1 | −1 | −1 | −1 | −1 | −1 | −1 | −1 | −1 | −1 | 37 | 37 | −1 | −1 | −1 | −1 | −1 | −1 | −1 | −1 |
| 38 | −1 | −1 | −1 | −1 | −1 | −1 | 38 | 38 | 38 | −1 | −1 | −1 | −1 | −1 | −1 | −1 | −1 | −1 | −1 | −1 | −1 | 38 | 38 | −1 | −1 | −1 | −1 | −1 | −1 | −1 |
| 39 | −1 | −1 | −1 | −1 | −1 | −1 | −1 | 39 | 39 | 39 | −1 | −1 | −1 | −1 | −1 | −1 | −1 | −1 | −1 | −1 | −1 | −1 | 39 | 39 | −1 | −1 | −1 | −1 | −1 | −1 |
| 40 | −1 | −1 | −1 | −1 | −1 | −1 | −1 | −1 | 40 | 40 | 40 | −1 | −1 | −1 | −1 | −1 | −1 | −1 | −1 | −1 | −1 | −1 | −1 | 40 | 40 | −1 | −1 | −1 | −1 | −1 |
| 41 | −1 | −1 | −1 | −1 | −1 | −1 | −1 | −1 | −1 | 41 | 41 | 41 | −1 | −1 | −1 | −1 | −1 | −1 | −1 | −1 | −1 | −1 | −1 | −1 | 41 | 41 | −1 | −1 | −1 | −1 |
| 42 | −1 | −1 | −1 | −1 | −1 | −1 | −1 | −1 | −1 | −1 | 42 | 42 | 42 | −1 | −1 | −1 | −1 | −1 | −1 | −1 | −1 | −1 | −1 | −1 | −1 | 42 | 42 | −1 | −1 | −1 |
| 43 | −1 | −1 | −1 | −1 | −1 | −1 | −1 | −1 | −1 | −1 | −1 | 43 | 43 | 43 | −1 | −1 | −1 | −1 | −1 | −1 | −1 | −1 | −1 | −1 | −1 | −1 | 43 | 43 | −1 | −1 |
| 44 | −1 | −1 | −1 | −1 | −1 | −1 | −1 | −1 | −1 | −1 | −1 | −1 | 44 | 44 | 44 | −1 | −1 | −1 | −1 | −1 | −1 | −1 | −1 | −1 | −1 | −1 | −1 | 44 | 44 | −1 |
| 45 | −1 | −1 | −1 | −1 | −1 | −1 | −1 | −1 | −1 | −1 | −1 | −1 | −1 | 45 | 45 | 45 | −1 | −1 | −1 | −1 | −1 | −1 | −1 | −1 | −1 | −1 | −1 | −1 | −1 | 45 |
| 46 | 46 | −1 | −1 | −1 | −1 | −1 | −1 | −1 | −1 | −1 | −1 | −1 | −1 | −1 | 46 | 46 | −1 | −1 | −1 | −1 | −1 | −1 | −1 | −1 | −1 | −1 | −1 | −1 | −1 | −1 |
| 47 | 47 | 47 | −1 | −1 | −1 | −1 | −1 | −1 | −1 | −1 | −1 | −1 | −1 | −1 | −1 | 47 | 47 | −1 | −1 | −1 | −1 | −1 | −1 | −1 | −1 | −1 | −1 | −1 | −1 | −1 |

| | θ1 | | | | | | | | | | | | | | | | | |
|---|---|---|---|---|---|---|---|---|---|---|---|---|---|---|---|---|---|---|
| θ2 | 30 | 31 | 32 | 33 | 34 | 35 | 36 | 37 | 38 | 39 | 40 | 41 | 42 | 43 | 44 | 45 | 46 | 47 |
| 0 | 46 | 31 | 32 | −1 | −1 | −1 | −1 | −1 | −1 | −1 | −1 | −1 | −1 | −1 | −1 | −1 | 46 | 47 |
| 1 | −1 | 47 | 32 | 33 | −1 | −1 | −1 | −1 | −1 | −1 | −1 | −1 | −1 | −1 | −1 | −1 | −1 | 47 |
| 2 | −1 | −1 | 32 | 33 | 34 | −1 | −1 | −1 | −1 | −1 | −1 | −1 | −1 | −1 | −1 | −1 | −1 | −1 |
| 3 | −1 | −1 | −1 | 33 | 34 | 35 | −1 | −1 | −1 | −1 | −1 | −1 | −1 | −1 | −1 | −1 | −1 | −1 |
| 4 | −1 | −1 | −1 | −1 | 34 | 35 | 36 | −1 | −1 | −1 | −1 | −1 | −1 | −1 | −1 | −1 | −1 | −1 |
| 5 | −1 | −1 | −1 | −1 | −1 | 35 | 36 | 37 | −1 | −1 | −1 | −1 | −1 | −1 | −1 | −1 | −1 | −1 |
| 6 | −1 | −1 | −1 | −1 | −1 | −1 | 36 | 37 | 38 | −1 | −1 | −1 | −1 | −1 | −1 | −1 | −1 | −1 |
| 7 | −1 | −1 | −1 | −1 | −1 | −1 | −1 | 37 | 38 | 39 | −1 | −1 | −1 | −1 | −1 | −1 | −1 | −1 |
| 8 | −1 | −1 | −1 | −1 | −1 | −1 | −1 | −1 | 38 | 39 | 40 | −1 | −1 | −1 | −1 | −1 | −1 | −1 |
| 9 | −1 | −1 | −1 | −1 | −1 | −1 | −1 | −1 | −1 | 39 | 40 | 41 | −1 | −1 | −1 | −1 | −1 | −1 |
| 10 | −1 | −1 | −1 | −1 | −1 | −1 | −1 | −1 | −1 | −1 | 40 | 41 | 42 | −1 | −1 | −1 | −1 | −1 |
| 11 | −1 | −1 | −1 | −1 | −1 | −1 | −1 | −1 | −1 | −1 | −1 | 41 | 42 | 43 | −1 | −1 | −1 | −1 |
| 12 | −1 | −1 | −1 | −1 | −1 | −1 | −1 | −1 | −1 | −1 | −1 | −1 | 42 | 43 | 44 | −1 | −1 | −1 |
| 13 | 45 | −1 | −1 | −1 | −1 | −1 | −1 | −1 | −1 | −1 | −1 | −1 | −1 | 43 | 44 | 45 | −1 | −1 |
| 14 | 30 | 46 | −1 | −1 | −1 | −1 | −1 | −1 | −1 | −1 | −1 | −1 | −1 | −1 | 44 | 45 | 46 | −1 |
| 15 | 30 | 31 | −1 | −1 | −1 | −1 | −1 | −1 | −1 | −1 | −1 | −1 | −1 | −1 | −1 | 45 | 46 | 47 |
| 16 | −1 | 47 | 32 | −1 | −1 | −1 | −1 | −1 | −1 | −1 | −1 | −1 | −1 | −1 | −1 | −1 | −1 | 47 |
| 17 | −1 | −1 | 32 | 33 | −1 | −1 | −1 | −1 | −1 | −1 | −1 | −1 | −1 | −1 | −1 | −1 | −1 | −1 |
| 18 | −1 | −1 | −1 | 33 | 34 | −1 | −1 | −1 | −1 | −1 | −1 | −1 | −1 | −1 | −1 | −1 | −1 | −1 |
| 19 | −1 | −1 | −1 | −1 | 34 | 35 | −1 | −1 | −1 | −1 | −1 | −1 | −1 | −1 | −1 | −1 | −1 | −1 |
| 20 | −1 | −1 | −1 | −1 | −1 | 35 | 36 | −1 | −1 | −1 | −1 | −1 | −1 | −1 | −1 | −1 | −1 | −1 |
| 21 | −1 | −1 | −1 | −1 | −1 | −1 | 36 | 37 | −1 | −1 | −1 | −1 | −1 | −1 | −1 | −1 | −1 | −1 |
| 22 | −1 | −1 | −1 | −1 | −1 | −1 | −1 | 37 | 38 | −1 | −1 | −1 | −1 | −1 | −1 | −1 | −1 | −1 |
| 23 | −1 | −1 | −1 | −1 | −1 | −1 | −1 | −1 | 38 | 39 | −1 | −1 | −1 | −1 | −1 | −1 | −1 | −1 |
| 24 | −1 | −1 | −1 | −1 | −1 | −1 | −1 | −1 | −1 | 39 | 40 | −1 | −1 | −1 | −1 | −1 | −1 | −1 |
| 25 | −1 | −1 | −1 | −1 | −1 | −1 | −1 | −1 | −1 | −1 | 40 | 41 | −1 | −1 | −1 | −1 | −1 | −1 |
| 26 | −1 | −1 | −1 | −1 | −1 | −1 | −1 | −1 | −1 | −1 | −1 | 41 | 42 | −1 | −1 | −1 | −1 | −1 |
| 27 | −1 | −1 | −1 | −1 | −1 | −1 | −1 | −1 | −1 | −1 | −1 | −1 | 42 | 43 | −1 | −1 | −1 | −1 |
| 28 | −1 | −1 | −1 | −1 | −1 | −1 | −1 | −1 | −1 | −1 | −1 | −1 | −1 | 43 | 44 | −1 | −1 | −1 |
| 29 | 45 | −1 | −1 | −1 | −1 | −1 | −1 | −1 | −1 | −1 | −1 | −1 | −1 | −1 | 44 | 45 | −1 | −1 |
| 30 | 30 | 46 | −1 | −1 | −1 | −1 | −1 | −1 | −1 | −1 | −1 | −1 | −1 | −1 | −1 | 45 | 46 | −1 |
| 31 | 46 | 31 | −1 | −1 | −1 | −1 | −1 | −1 | −1 | −1 | −1 | −1 | −1 | −1 | −1 | −1 | 46 | 47 |
| 32 | −1 | −1 | 32 | −1 | −1 | −1 | −1 | −1 | −1 | −1 | −1 | −1 | −1 | −1 | −1 | −1 | −1 | −1 |
| 33 | −1 | −1 | −1 | 33 | −1 | −1 | −1 | −1 | −1 | −1 | −1 | −1 | −1 | −1 | −1 | −1 | −1 | −1 |
| 34 | −1 | −1 | −1 | −1 | 34 | −1 | −1 | −1 | −1 | −1 | −1 | −1 | −1 | −1 | −1 | −1 | −1 | −1 |
| 35 | −1 | −1 | −1 | −1 | −1 | 35 | −1 | −1 | −1 | −1 | −1 | −1 | −1 | −1 | −1 | −1 | −1 | −1 |
| 36 | −1 | −1 | −1 | −1 | −1 | −1 | 36 | −1 | −1 | −1 | −1 | −1 | −1 | −1 | −1 | −1 | −1 | −1 |
| 37 | −1 | −1 | −1 | −1 | −1 | −1 | −1 | 37 | −1 | −1 | −1 | −1 | −1 | −1 | −1 | −1 | −1 | −1 |
| 38 | −1 | −1 | −1 | −1 | −1 | −1 | −1 | 38 | −1 | −1 | −1 | −1 | −1 | −1 | −1 | −1 | −1 | −1 |
| 39 | −1 | −1 | −1 | −1 | −1 | −1 | −1 | −1 | −1 | 39 | −1 | −1 | −1 | −1 | −1 | −1 | −1 | −1 |
| 40 | −1 | −1 | −1 | −1 | −1 | −1 | −1 | −1 | −1 | −1 | 40 | −1 | −1 | −1 | −1 | −1 | −1 | −1 |
| 41 | −1 | −1 | −1 | −1 | −1 | −1 | −1 | −1 | −1 | −1 | −1 | 41 | −1 | −1 | −1 | −1 | −1 | −1 |
| 42 | −1 | −1 | −1 | −1 | −1 | −1 | −1 | −1 | −1 | −1 | −1 | −1 | 42 | −1 | −1 | −1 | −1 | −1 |
| 43 | −1 | −1 | −1 | −1 | −1 | −1 | −1 | −1 | −1 | −1 | −1 | −1 | −1 | 43 | −1 | −1 | −1 | −1 |
| 44 | −1 | −1 | −1 | −1 | −1 | −1 | −1 | −1 | −1 | −1 | −1 | −1 | −1 | −1 | 44 | −1 | −1 | −1 |
| 45 | 45 | −1 | −1 | −1 | −1 | −1 | −1 | −1 | −1 | −1 | −1 | −1 | −1 | −1 | −1 | 45 | −1 | −1 |
| 46 | 46 | 46 | −1 | −1 | −1 | −1 | −1 | −1 | −1 | −1 | −1 | −1 | −1 | −1 | −1 | −1 | 46 | −1 |
| 47 | −1 | 47 | −1 | −1 | −1 | −1 | −1 | −1 | −1 | −1 | −1 | −1 | −1 | −1 | −1 | −1 | −1 | 47 | use of the table consisting, on the one hand, in declaring the connection valid when the datum in said table corresponding to the intersection of the values θ1, θ2 of the orientations of the two contour points is different from −1, and on the other hand in conferring on the end-point of the connection an orientation value equal to that of said datum.

According to another aspect of the invention, the stream of digital data is stored in a memory comprising three block memories, each of a capacity of n points, capable of permitting, by circular permutation of said block memories, the storage of n points in a block memory and simultaneously the processing of the data contained in the other two block memories.

The invention extends to a device for detection of straight-line segments in a stream of digital data which are supplied at a pixel frequency and which are representative of an image (m, n) in which the contour points of said image are identified. According to the invention this detection device comprises:

- a data storage for storing the stream of digital data in the form of successive lines each consisting of n data items,
- a buffer circuit comprising:
  - registers for successive reading of the digital data to be processed,
  - registers for storing the results of the processing of the digital data, representative of the coordinates of the extremity points and of the orientation of the straight-line segments,
  - and working registers,
- a management module receiving a clock signal that is representative of the pixel frequency of supply of the digital data, said management module being linked to the data storage and to the buffer circuit and being adapted, on the one hand, to manage the padding and the processing at the pixel frequency of the digital data in the data storage and on the other hand the reciprocal exchange of data between the data storage and the buffer circuit,
- a programmed calculation module for performing tests intended for the processing of the digital data in the reading registers,
- and a sequencer which receives a clock signal that is representative of the pixel frequency and which is adapted, as a function of the results supplied by the calculation module, to control the management module and the buffer circuit with a view to the transfers of data between said buffer circuit and the data storage.

Moreover, and in advantageous manner, the data storage comprises three block memories each capable of storing a line of n digital data items, the management module being adapted to control a circular permutation of said memory blocks which is capable of permitting the storage of n data items in a block memory and simultaneously the processing of the data contained in the other two block memories.

Furthermore, this detection device advantageously comprises a calculation module which receives the results stored in the storage registers and representative of the orientations of the straight-line segments detected and which is programmed to calculate the histogram of said orientations.

Other characteristics, aims and advantages of the invention will become apparent from the detailed description which follows with reference to the attached drawings which represent an illustrated embodiment of said invention by way of non-limiting example. In these drawings:

BRIEF DESCRIPTION OF THE FIGURES

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey an information regarding the actual shape of the particular elements, and have been solely selected for ease of recognition in the drawings.

DETAILED DESCRIPTION OF THE INVENTION

In the following description, certain specific details are set forth in order to provide a through understanding of various embodiments of the invention. However, one skilled in the art will understand that the invention may be practiced without these details. In other instances, well-known structures associated with automatic data collection devices such as bar code readers and other image processors have not been shown or described in detail to avoid unnecessarily obscuring descriptions of the embodiments of the invention.

The headings provided herein are for convenience only and do not interpret the scope of meaning of the claimed invention.

Figure 3:
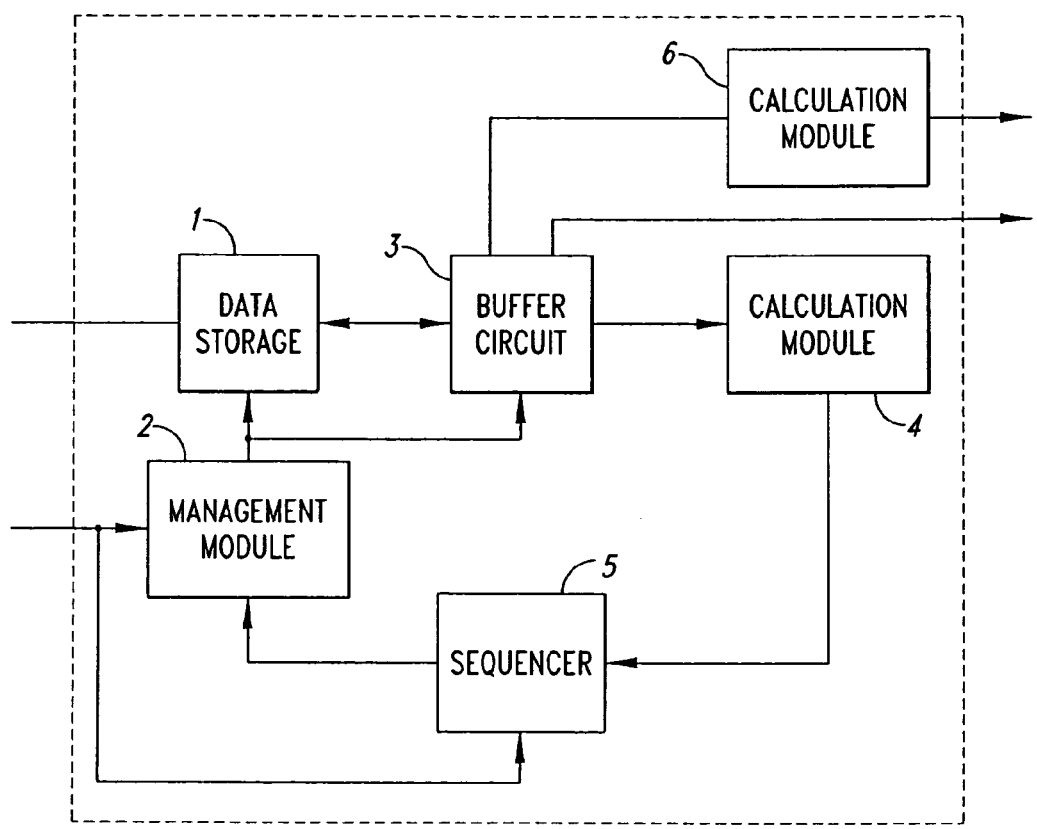
FIG. 3 is a synoptic diagram of a device conforming to the invention for detection of straight-line segments.

The device conforming to the invention for detection of straight-line segments which is represented in FIG. 3 is adapted to process a stream of digital data which are supplied at a pixel frequency and which are representative of an image (m, n) in which the contour points of said image are identified.

In classical manner, the image (m, n) is a reduced image, normally of size T/16, of the image formed on a photosensitive matrix, obtained in accordance with the pyramidal method of BURT.

Moreover, the contour points of this image are defined by the modulus and the orientation, in relation to a horizontal axis, of their gradient, the gradient representing the magnitude of the contrast between two points. These contour points are determined classically in accordance with the masks method of ROBERTS, by retaining as contour points the sole points for which the modulus of the gradient is greater than a predetermined threshold and maximal in the direction of said gradient defined by the argument of the latter, the other points being considered as not pertaining to a contour and being identified by a value equal to −1 of the orientation of their gradient.

Moreover, the orientations of the gradients of the contour points exhibit values between 0 and 15, obtained by a division of the trigonometric circle into 16 sectors each equal to 22.5 degrees, each of said values corresponding to an orientation in relation to a horizontal axis within the corresponding sector.

The detection device according to the invention comprises, firstly, data storage 1 for storing the stream of digital data, comprising three block memories of a capacity of n points, each consequently capable of storing the set of the n points of each line of the image (m, n), said block memories being adapted so that one block memory is dedicated to the storage of one line of digital data and the other two block memories are dedicated to the processing of the two lines of data stored beforehand.

The detection device comprises, moreover, a management module 2 receiving a pixel clock signal providing it with information concerning the number of digital data items supplied to the data storage 1. On the basis of this information this management module 2 is adapted, firstly, to manage the set of control signals necessary for operation of the data storage 1 and to control a circular permutation of the block memories.

The detection device also comprises a buffer circuit 3 composed of ten registers, the respective assignments of which are the following:
- four registers for reading four points utilised at the time of the processing, as described below,
- three registers for storing the results of the processing, namely coordinates of the origin point and of the final point and orientation of each straight-line segment,
- three working registers for temporary storage of the data utilised at the time of processing.

The detection device comprises, furthermore, a calculation module 4 adapted to perform the tests necessary for processing of the digital data, described in detail below.

Figure 1:
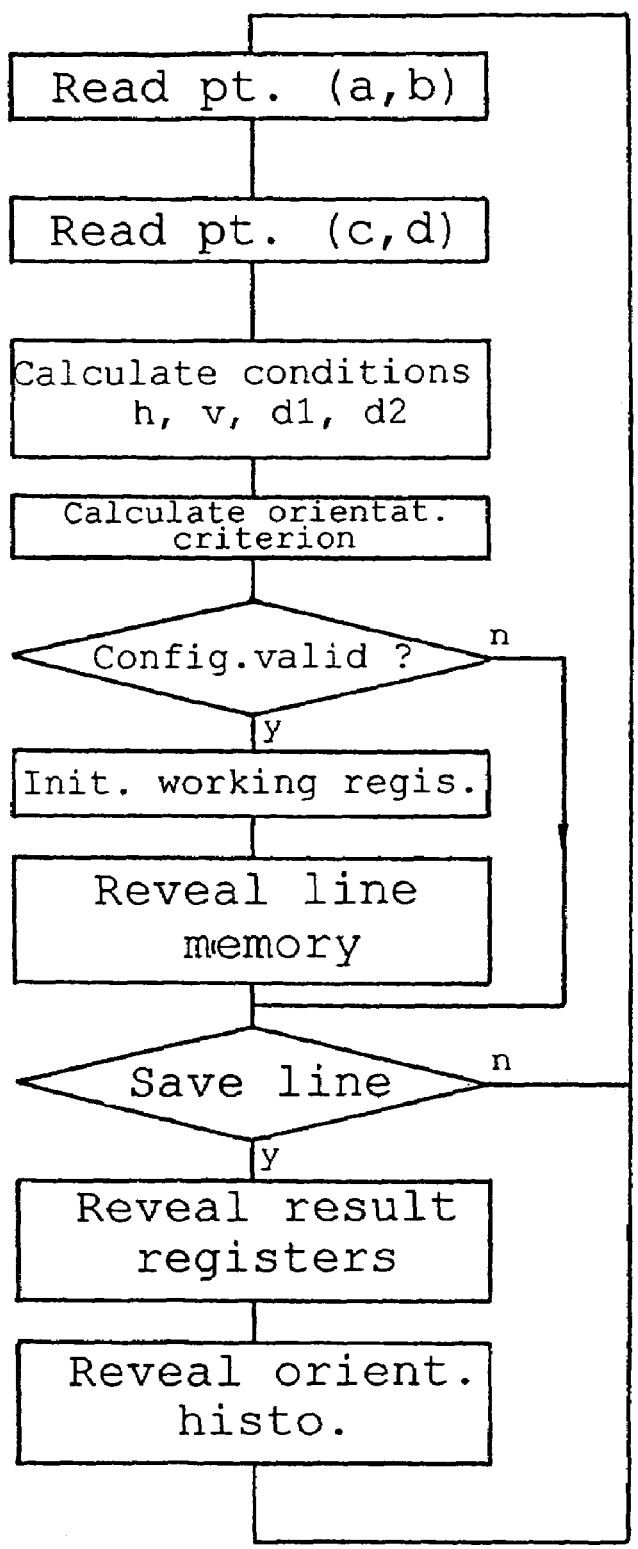
FIG. 1 represents the algorithm for processing the digital data which is implemented in accordance with the invention.

The detection device comprises, moreover, a sequencer 5 conceived for implementing the algorithm represented in FIG. 1, at a rate which is ensured by the pixel clock to which said sequencer is linked for this purpose.

With a view implementing the algorithm, this sequencer 5 is firstly linked to the calculation module 4 so as to retrieve the tests performed by said calculation module. It is, moreover, linked to the management module 2 with a view to controlling the transfer of the digital data from the data storage 1 to the buffer circuit 3 and conversely the transfer of the working data contained in the buffer circuit to the data storage 1.

The actual algorithm which is implemented by the sequencer 5 consists, firstly, in reading, for each current point to be processed Pc(i,j), said point and the three neighbouring points Pa(i−1, j−1), Pb(i, j−1) and Pd(i−1,j) having inferior coordinates which are transferred to the reading registers.

Figure 2:
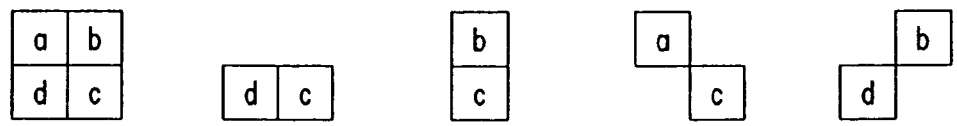
FIG. 2 represents the four possible configurations of connection between four neighbouring points, which are tested at the time of the processing of each point.

The first tests performed on these four points consist in determining whether a connection between two of these points is effective according to one of the configurations represented in FIG. 2. To this end, and for each of these configurations, it is verified whether the values of the orientations of the two points concerned, when the latter are contour points, are close. In order to do this, use is made of the following table, and the connection is declared valid if the value of said table corresponding to the intersection of the values $\theta1$, $\theta2$ of the orientations of the two contour points processed is different from −1. It is to be noted that the values of this table can be obtained in classical manner either by means of a stored table or by the solution of logical equations.

| | $\theta1$ | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| $\theta2$ | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
| 0 | 00 | 16 | 32 | −1 | −1 | −1 | −1 | −1 | −1 | −1 | −1 | −1 | −1 | −1 | 46 | 31 | 16 | 32 | −1 | −1 | −1 | −1 | −1 | −1 | −1 | −1 | −1 | −1 | −1 | −1 |
| 1 | 16 | 01 | 17 | 33 | −1 | −1 | −1 | −1 | −1 | −1 | −1 | −1 | −1 | −1 | −1 | 47 | 16 | 17 | 33 | −1 | −1 | −1 | −1 | −1 | −1 | −1 | −1 | −1 | −1 | −1 |
| 2 | 32 | 17 | 02 | 18 | 34 | −1 | −1 | −1 | −1 | −1 | −1 | −1 | −1 | −1 | −1 | −1 | 32 | 17 | 18 | 34 | −1 | −1 | −1 | −1 | −1 | −1 | −1 | −1 | −1 | −1 |
| 3 | −1 | 33 | 18 | 03 | 19 | 35 | −1 | −1 | −1 | −1 | −1 | −1 | −1 | −1 | −1 | −1 | −1 | 33 | 18 | 19 | 35 | −1 | −1 | −1 | −1 | −1 | −1 | −1 | −1 | −1 |
| 4 | −1 | −1 | 34 | 19 | 04 | 20 | 36 | −1 | −1 | −1 | −1 | −1 | −1 | −1 | −1 | −1 | −1 | −1 | 34 | 19 | 20 | 36 | −1 | −1 | −1 | −1 | −1 | −1 | −1 | −1 |
| 5 | −1 | −1 | −1 | 35 | 20 | 05 | 21 | 37 | −1 | −1 | −1 | −1 | −1 | −1 | −1 | −1 | −1 | −1 | −1 | 35 | 20 | 21 | 37 | −1 | −1 | −1 | −1 | −1 | −1 | −1 |
| 6 | −1 | −1 | −1 | −1 | 36 | 21 | 06 | 22 | 38 | −1 | −1 | −1 | −1 | −1 | −1 | −1 | −1 | −1 | −1 | −1 | 36 | 21 | 22 | 38 | −1 | −1 | −1 | −1 | −1 | −1 |
| 7 | −1 | −1 | −1 | −1 | −1 | 37 | 22 | 07 | 23 | 39 | −1 | −1 | −1 | −1 | −1 | −1 | −1 | −1 | −1 | −1 | −1 | 37 | 22 | 23 | 39 | −1 | −1 | −1 | −1 | −1 |
| 8 | −1 | −1 | −1 | −1 | −1 | −1 | 38 | 23 | 08 | 24 | 40 | −1 | −1 | −1 | −1 | −1 | −1 | −1 | −1 | −1 | −1 | −1 | 38 | 23 | 24 | 40 | −1 | −1 | −1 | −1 |
| 9 | −1 | −1 | −1 | −1 | −1 | −1 | −1 | 39 | 24 | 09 | 25 | 41 | −1 | −1 | −1 | −1 | −1 | −1 | −1 | −1 | −1 | −1 | −1 | 39 | 24 | 25 | 41 | −1 | −1 | −1 |
| 10 | −1 | −1 | −1 | −1 | −1 | −1 | −1 | −1 | 40 | 25 | 10 | 26 | 42 | −1 | −1 | −1 | −1 | −1 | −1 | −1 | −1 | −1 | −1 | −1 | 40 | 25 | 26 | 42 | −1 | −1 |
| 11 | −1 | −1 | −1 | −1 | −1 | −1 | −1 | −1 | −1 | 41 | 26 | 11 | 27 | 43 | −1 | −1 | −1 | −1 | −1 | −1 | −1 | −1 | −1 | −1 | −1 | 41 | 26 | 27 | 43 | −1 |
| 12 | −1 | −1 | −1 | −1 | −1 | −1 | −1 | −1 | −1 | −1 | 42 | 27 | 12 | 28 | 44 | −1 | −1 | −1 | −1 | −1 | −1 | −1 | −1 | −1 | −1 | −1 | 42 | 27 | 28 | 44 |
| 13 | −1 | −1 | −1 | −1 | −1 | −1 | −1 | −1 | −1 | −1 | −1 | 43 | 28 | 13 | 29 | 45 | −1 | −1 | −1 | −1 | −1 | −1 | −1 | −1 | −1 | −1 | −1 | 43 | 28 | 29 |
| 14 | 46 | −1 | −1 | −1 | −1 | −1 | −1 | −1 | −1 | −1 | −1 | −1 | 44 | 29 | 14 | 30 | −1 | −1 | −1 | −1 | −1 | −1 | −1 | −1 | −1 | −1 | −1 | −1 | 44 | 29 |
| 15 | 31 | 47 | −1 | −1 | −1 | −1 | −1 | −1 | −1 | −1 | −1 | −1 | −1 | 45 | 30 | 15 | 47 | −1 | −1 | −1 | −1 | −1 | −1 | −1 | −1 | −1 | −1 | −1 | −1 | 45 |
| 16 | 16 | 16 | 32 | −1 | −1 | −1 | −1 | −1 | −1 | −1 | −1 | −1 | −1 | −1 | 47 | 16 | 32 | −1 | −1 | −1 | −1 | −1 | −1 | −1 | −1 | −1 | −1 | −1 | −1 | −1 |
| 17 | 32 | 17 | 17 | 33 | −1 | −1 | −1 | −1 | −1 | −1 | −1 | −1 | −1 | −1 | −1 | 32 | 17 | 33 | −1 | −1 | −1 | −1 | −1 | −1 | −1 | −1 | −1 | −1 | −1 | −1 |
| 18 | −1 | 33 | 18 | 18 | 34 | −1 | −1 | −1 | −1 | −1 | −1 | −1 | −1 | −1 | −1 | −1 | 33 | 18 | 34 | −1 | −1 | −1 | −1 | −1 | −1 | −1 | −1 | −1 | −1 | −1 |
| 19 | −1 | −1 | 34 | 19 | 19 | 35 | −1 | −1 | −1 | −1 | −1 | −1 | −1 | −1 | −1 | −1 | −1 | 34 | 19 | 35 | −1 | −1 | −1 | −1 | −1 | −1 | −1 | −1 | −1 | −1 |
| 20 | −1 | −1 | −1 | 35 | 20 | 20 | 36 | −1 | −1 | −1 | −1 | −1 | −1 | −1 | −1 | −1 | −1 | −1 | 35 | 20 | 36 | −1 | −1 | −1 | −1 | −1 | −1 | −1 | −1 | −1 |
| 21 | −1 | −1 | −1 | −1 | 36 | 21 | 21 | 37 | −1 | −1 | −1 | −1 | −1 | −1 | −1 | −1 | −1 | −1 | −1 | 36 | 21 | 37 | −1 | −1 | −1 | −1 | −1 | −1 | −1 | −1 |
| 22 | −1 | −1 | −1 | −1 | −1 | 37 | 22 | 22 | 38 | −1 | −1 | −1 | −1 | −1 | −1 | −1 | −1 | −1 | −1 | −1 | 37 | 22 | 38 | −1 | −1 | −1 | −1 | −1 | −1 | −1 |
| 23 | −1 | −1 | −1 | −1 | −1 | −1 | 38 | 23 | 23 | 39 | −1 | −1 | −1 | −1 | −1 | −1 | −1 | −1 | −1 | −1 | −1 | 38 | 23 | 39 | −1 | −1 | −1 | −1 | −1 | −1 |
| 24 | −1 | −1 | −1 | −1 | −1 | −1 | −1 | 39 | 24 | 24 | 40 | −1 | −1 | −1 | −1 | −1 | −1 | −1 | −1 | −1 | −1 | −1 | 39 | 24 | 40 | −1 | −1 | −1 | −1 | −1 |
| 25 | −1 | −1 | −1 | −1 | −1 | −1 | −1 | −1 | 40 | 25 | 25 | 41 | −1 | −1 | −1 | −1 | −1 | −1 | −1 | −1 | −1 | −1 | −1 | 40 | 25 | 41 | −1 | −1 | −1 | −1 |
| 26 | −1 | −1 | −1 | −1 | −1 | −1 | −1 | −1 | −1 | 41 | 26 | 26 | 42 | −1 | −1 | −1 | −1 | −1 | −1 | −1 | −1 | −1 | −1 | −1 | 41 | 26 | 42 | −1 | −1 | −1 |
| 27 | −1 | −1 | −1 | −1 | −1 | −1 | −1 | −1 | −1 | −1 | 42 | 27 | 27 | 43 | −1 | −1 | −1 | −1 | −1 | −1 | −1 | −1 | −1 | −1 | −1 | 42 | 27 | 43 | −1 | −1 |
| 28 | −1 | −1 | −1 | −1 | −1 | −1 | −1 | −1 | −1 | −1 | −1 | 43 | 28 | 28 | 44 | −1 | −1 | −1 | −1 | −1 | −1 | −1 | −1 | −1 | −1 | −1 | 43 | 28 | 44 | −1 |
| 29 | −1 | −1 | −1 | −1 | −1 | −1 | −1 | −1 | −1 | −1 | −1 | −1 | 44 | 29 | 29 | 45 | −1 | −1 | −1 | −1 | −1 | −1 | −1 | −1 | −1 | −1 | −1 | −1 | 44 | 29 |
| 30 | 46 | −1 | −1 | −1 | −1 | −1 | −1 | −1 | −1 | −1 | −1 | −1 | −1 | 45 | 30 | 30 | −1 | −1 | −1 | −1 | −1 | −1 | −1 | −1 | −1 | −1 | −1 | −1 | −1 | 45 |
| 31 | 31 | 47 | −1 | −1 | −1 | −1 | −1 | −1 | −1 | −1 | −1 | −1 | −1 | −1 | 46 | 31 | 47 | −1 | −1 | −1 | −1 | −1 | −1 | −1 | −1 | −1 | −1 | −1 | −1 | −1 |
| 32 | 32 | 32 | 32 | −1 | −1 | −1 | −1 | −1 | −1 | −1 | −1 | −1 | −1 | −1 | −1 | 32 | 32 | −1 | −1 | −1 | −1 | −1 | −1 | −1 | −1 | −1 | −1 | −1 | −1 | −1 |

-continued

```
33  -1  33  33  33  -1  -1  -1  -1  -1  -1  -1  -1  -1  -1  -1  -1  -1  -1  33  33  -1  -1  -1  -1  -1  -1  -1  -1  -1
34  -1  -1  34  34  34  -1  -1  -1  -1  -1  -1  -1  -1  -1  -1  -1  -1  -1  -1  34  34  -1  -1  -1  -1  -1  -1  -1  -1
35  -1  -1  -1  35  35  35  -1  -1  -1  -1  -1  -1  -1  -1  -1  -1  -1  -1  -1  -1  35  35  -1  -1  -1  -1  -1  -1  -1
36  -1  -1  -1  -1  36  36  36  -1  -1  -1  -1  -1  -1  -1  -1  -1  -1  -1  -1  -1  -1  36  36  -1  -1  -1  -1  -1  -1
37  -1  -1  -1  -1  -1  37  37  37  -1  -1  -1  -1  -1  -1  -1  -1  -1  -1  -1  -1  -1  -1  37  37  -1  -1  -1  -1  -1
38  -1  -1  -1  -1  -1  -1  38  38  38  -1  -1  -1  -1  -1  -1  -1  -1  -1  -1  -1  -1  -1  -1  38  38  -1  -1  -1  -1
39  -1  -1  -1  -1  -1  -1  -1  39  39  39  -1  -1  -1  -1  -1  -1  -1  -1  -1  -1  -1  -1  -1  -1  39  39  -1  -1  -1
40  -1  -1  -1  -1  -1  -1  -1  -1  40  40  40  -1  -1  -1  -1  -1  -1  -1  -1  -1  -1  -1  -1  -1  -1  40  40  -1  -1
41  -1  -1  -1  -1  -1  -1  -1  -1  -1  41  41  41  -1  -1  -1  -1  -1  -1  -1  -1  -1  -1  -1  -1  -1  -1  41  41  -1
42  -1  -1  -1  -1  -1  -1  -1  -1  -1  -1  42  42  42  -1  -1  -1  -1  -1  -1  -1  -1  -1  -1  -1  -1  -1  -1  42  42
43  -1  -1  -1  -1  -1  -1  -1  -1  -1  -1  -1  43  43  43  -1  -1  -1  -1  -1  -1  -1  -1  -1  -1  -1  -1  -1  -1  43
44  -1  -1  -1  -1  -1  -1  -1  -1  -1  -1  -1  -1  44  44  44  -1  -1  -1  -1  -1  -1  -1  -1  -1  -1  -1  -1  -1  -1
45  -1  -1  -1  -1  -1  -1  -1  -1  -1  -1  -1  -1  -1  45  45  45  -1  -1  -1  -1  -1  -1  -1  -1  -1  -1  -1  -1  -1
46  46  -1  -1  -1  -1  -1  -1  -1  -1  -1  -1  -1  -1  -1  46  46  -1  -1  -1  -1  -1  -1  -1  -1  -1  -1  -1  -1  -1
47  47  47  -1  -1  -1  -1  -1  -1  -1  -1  -1  -1  -1  47  47  -1  -1  -1  -1  -1  -1  -1  -1  -1  -1  -1  -1  -1  -1
```

|    | θ1 |    |    |    |    |    |    |    |    |    |    |    |    |    |    |    |    |    |
|----|----|----|----|----|----|----|----|----|----|----|----|----|----|----|----|----|----|----|
| θ2 | 30 | 31 | 32 | 33 | 34 | 35 | 36 | 37 | 38 | 39 | 40 | 41 | 42 | 43 | 44 | 45 | 46 | 47 |
| 0  | 46 | 31 | 32 | -1 | -1 | -1 | -1 | -1 | -1 | -1 | -1 | -1 | -1 | -1 | -1 | -1 | 46 | 47 |
| 1  | -1 | 47 | 32 | 33 | -1 | -1 | -1 | -1 | -1 | -1 | -1 | -1 | -1 | -1 | -1 | -1 | -1 | 47 |
| 2  | -1 | -1 | 32 | 33 | 34 | -1 | -1 | -1 | -1 | -1 | -1 | -1 | -1 | -1 | -1 | -1 | -1 | -1 |
| 3  | -1 | -1 | -1 | 33 | 34 | 35 | -1 | -1 | -1 | -1 | -1 | -1 | -1 | -1 | -1 | -1 | -1 | -1 |
| 4  | -1 | -1 | -1 | -1 | 34 | 35 | 36 | -1 | -1 | -1 | -1 | -1 | -1 | -1 | -1 | -1 | -1 | -1 |
| 5  | -1 | -1 | -1 | -1 | -1 | 35 | 36 | 37 | -1 | -1 | -1 | -1 | -1 | -1 | -1 | -1 | -1 | -1 |
| 6  | -1 | -1 | -1 | -1 | -1 | -1 | 36 | 37 | 38 | -1 | -1 | -1 | -1 | -1 | -1 | -1 | -1 | -1 |
| 7  | -1 | -1 | -1 | -1 | -1 | -1 | -1 | 37 | 38 | 39 | -1 | -1 | -1 | -1 | -1 | -1 | -1 | -1 |
| 8  | -1 | -1 | -1 | -1 | -1 | -1 | -1 | -1 | 38 | 39 | 40 | -1 | -1 | -1 | -1 | -1 | -1 | -1 |
| 9  | -1 | -1 | -1 | -1 | -1 | -1 | -1 | -1 | -1 | 39 | 40 | 41 | -1 | -1 | -1 | -1 | -1 | -1 |
| 10 | -1 | -1 | -1 | -1 | -1 | -1 | -1 | -1 | -1 | -1 | 40 | 41 | 42 | -1 | -1 | -1 | -1 | -1 |
| 11 | -1 | -1 | -1 | -1 | -1 | -1 | -1 | -1 | -1 | -1 | -1 | 41 | 42 | 43 | -1 | -1 | -1 | -1 |
| 12 | -1 | -1 | -1 | -1 | -1 | -1 | -1 | -1 | -1 | -1 | -1 | -1 | 42 | 43 | 44 | -1 | -1 | -1 |
| 13 | 45 | -1 | -1 | -1 | -1 | -1 | -1 | -1 | -1 | -1 | -1 | -1 | -1 | 43 | 44 | 45 | -1 | -1 |
| 14 | 30 | 46 | -1 | -1 | -1 | -1 | -1 | -1 | -1 | -1 | -1 | -1 | -1 | -1 | 44 | 45 | 46 | -1 |
| 15 | 30 | 31 | -1 | -1 | -1 | -1 | -1 | -1 | -1 | -1 | -1 | -1 | -1 | -1 | -1 | 45 | 46 | 47 |
| 16 | -1 | 47 | 32 | -1 | -1 | -1 | -1 | -1 | -1 | -1 | -1 | -1 | -1 | -1 | -1 | -1 | -1 | 47 |
| 17 | -1 | -1 | 32 | 33 | -1 | -1 | -1 | -1 | -1 | -1 | -1 | -1 | -1 | -1 | -1 | -1 | -1 | -1 |
| 18 | -1 | -1 | -1 | 33 | 34 | -1 | -1 | -1 | -1 | -1 | -1 | -1 | -1 | -1 | -1 | -1 | -1 | -1 |
| 19 | -1 | -1 | -1 | -1 | 34 | 35 | -1 | -1 | -1 | -1 | -1 | -1 | -1 | -1 | -1 | -1 | -1 | -1 |
| 20 | -1 | -1 | -1 | -1 | -1 | 35 | 36 | -1 | -1 | -1 | -1 | -1 | -1 | -1 | -1 | -1 | -1 | -1 |
| 21 | -1 | -1 | -1 | -1 | -1 | -1 | 36 | 37 | -1 | -1 | -1 | -1 | -1 | -1 | -1 | -1 | -1 | -1 |
| 22 | -1 | -1 | -1 | -1 | -1 | -1 | -1 | 37 | 38 | -1 | -1 | -1 | -1 | -1 | -1 | -1 | -1 | -1 |
| 23 | -1 | -1 | -1 | -1 | -1 | -1 | -1 | -1 | 38 | 39 | -1 | -1 | -1 | -1 | -1 | -1 | -1 | -1 |
| 24 | -1 | -1 | -1 | -1 | -1 | -1 | -1 | -1 | -1 | 39 | 40 | -1 | -1 | -1 | -1 | -1 | -1 | -1 |
| 25 | -1 | -1 | -1 | -1 | -1 | -1 | -1 | -1 | -1 | -1 | 40 | 41 | -1 | -1 | -1 | -1 | -1 | -1 |
| 26 | -1 | -1 | -1 | -1 | -1 | -1 | -1 | -1 | -1 | -1 | -1 | 41 | 42 | -1 | -1 | -1 | -1 | -1 |
| 27 | -1 | -1 | -1 | -1 | -1 | -1 | -1 | -1 | -1 | -1 | -1 | -1 | 42 | 43 | -1 | -1 | -1 | -1 |
| 28 | -1 | -1 | -1 | -1 | -1 | -1 | -1 | -1 | -1 | -1 | -1 | -1 | -1 | 43 | 44 | -1 | -1 | -1 |
| 29 | 45 | -1 | -1 | -1 | -1 | -1 | -1 | -1 | -1 | -1 | -1 | -1 | -1 | -1 | 44 | 45 | -1 | -1 |
| 30 | 30 | 46 | -1 | -1 | -1 | -1 | -1 | -1 | -1 | -1 | -1 | -1 | -1 | -1 | -1 | 45 | 46 | -1 |
| 31 | 46 | 31 | -1 | -1 | -1 | -1 | -1 | -1 | -1 | -1 | -1 | -1 | -1 | -1 | -1 | -1 | 46 | 47 |
| 32 | -1 | -1 | 32 | -1 | -1 | -1 | -1 | -1 | -1 | -1 | -1 | -1 | -1 | -1 | -1 | -1 | -1 | -1 |
| 33 | -1 | -1 | -1 | 33 | -1 | -1 | -1 | -1 | -1 | -1 | -1 | -1 | -1 | -1 | -1 | -1 | -1 | -1 |
| 34 | -1 | -1 | -1 | -1 | 34 | -1 | -1 | -1 | -1 | -1 | -1 | -1 | -1 | -1 | -1 | -1 | -1 | -1 |
| 35 | -1 | -1 | -1 | -1 | -1 | 35 | -1 | -1 | -1 | -1 | -1 | -1 | -1 | -1 | -1 | -1 | -1 | -1 |
| 36 | -1 | -1 | -1 | -1 | -1 | -1 | 36 | -1 | -1 | -1 | -1 | -1 | -1 | -1 | -1 | -1 | -1 | -1 |
| 37 | -1 | -1 | -1 | -1 | -1 | -1 | -1 | 37 | -1 | -1 | -1 | -1 | -1 | -1 | -1 | -1 | -1 | -1 |
| 38 | -1 | -1 | -1 | -1 | -1 | -1 | -1 | -1 | 38 | -1 | -1 | -1 | -1 | -1 | -1 | -1 | -1 | -1 |
| 39 | -1 | -1 | -1 | -1 | -1 | -1 | -1 | -1 | -1 | 39 | -1 | -1 | -1 | -1 | -1 | -1 | -1 | -1 |
| 40 | -1 | -1 | -1 | -1 | -1 | -1 | -1 | -1 | -1 | -1 | 40 | -1 | -1 | -1 | -1 | -1 | -1 | -1 |
| 41 | -1 | -1 | -1 | -1 | -1 | -1 | -1 | -1 | -1 | -1 | -1 | 41 | -1 | -1 | -1 | -1 | -1 | -1 |
| 42 | -1 | -1 | -1 | -1 | -1 | -1 | -1 | -1 | -1 | -1 | -1 | -1 | 42 | -1 | -1 | -1 | -1 | -1 |
| 43 | -1 | -1 | -1 | -1 | -1 | -1 | -1 | -1 | -1 | -1 | -1 | -1 | -1 | 43 | -1 | -1 | -1 | -1 |
| 44 | -1 | -1 | -1 | -1 | -1 | -1 | -1 | -1 | -1 | -1 | -1 | -1 | -1 | -1 | 44 | -1 | -1 | -1 |
| 45 | 45 | -1 | -1 | -1 | -1 | -1 | -1 | -1 | -1 | -1 | -1 | -1 | -1 | -1 | -1 | 45 | -1 | -1 |
| 46 | 46 | 46 | -1 | -1 | -1 | -1 | -1 | -1 | -1 | -1 | -1 | -1 | -1 | -1 | -1 | -1 | 46 | -1 |
| 47 | -1 | 47 | -1 | -1 | -1 | -1 | -1 | -1 | -1 | -1 | -1 | -1 | -1 | -1 | -1 | -1 | -1 | 47 |

As is evident from analysis of the above table, a connection between two contour points is declared valid not only if the values of the orientation of the gradients of these contour points are identical but also if the values are "close", with a notion of tolerance concerning this "closeness" that is capable of evolving in line with the connections of contour points pertaining to the same segment, in accordance with the following principle. At the beginning, all the contour points are identified by an orientation θ of their gradient exhibiting a value between 0 and 15, representative of the sector of the trigonometric circle corresponding to this orientation. Subsequently the values θ which are written to the working registers and which are representative of these orientations evolve in line with the connections which are effected in the following manner:

- in the ideal case where the orientation of the segment remains constant, θ retains the starting value between 0 and 15,
- if the orientations of the contour points are situated in neighbouring sectors, the resulting θ takes a value between 16 and 31. At the time of the following connection which is realized on the basis of this new value the tolerance is diminished automatically,
- if the orientations of the contour points are situated in sectors separated by an intermediate sector, the resulting θ takes a value between 32 and 47. At the time of the following connection the tolerance is again diminished automatically.

Once the connection between two contour points has been validated, two types of processing can be applied, depending on whether the connection is of "classical" type as elucidated below or whether it links two points pertaining to a horizontal or practically horizontal line.

Firstly, at the time of the processing of the current point Pc (FIG. 2) a connection is of "classical" type when it corresponds to a connection between a segment S1 of a size greater than or equal to 1, the final extremity of which is situated in the preceding line and the coordinates of which are written to one of the points Pa or Pb, and a segment S2 of size 1 constituted by the current point Pc or by the point Pd.

In this case the processing consists in transferring to the contour point Pc or Pd forming the segment S2 the coordinates written to the point Pa or Pb corresponding to the final extremity of the segment S1, then in erasing from the memory the coordinates of said point Pa or Pb. In this way, by successive connections a straight-line segment S is obtained, the final extremity of which "points" at the origin extremity.

Figure 4A:
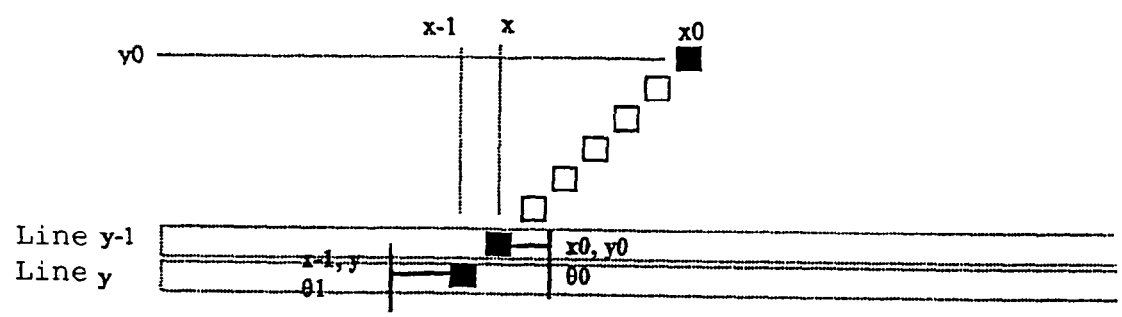
FIGS. 4a and 4b illustrate an example of classical connection between a straight-line segment and a contour point.
Figure 4B:
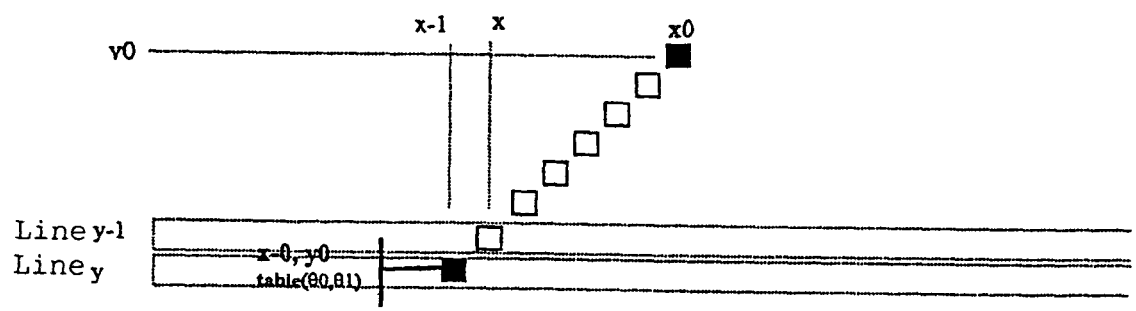
Figure 5A:
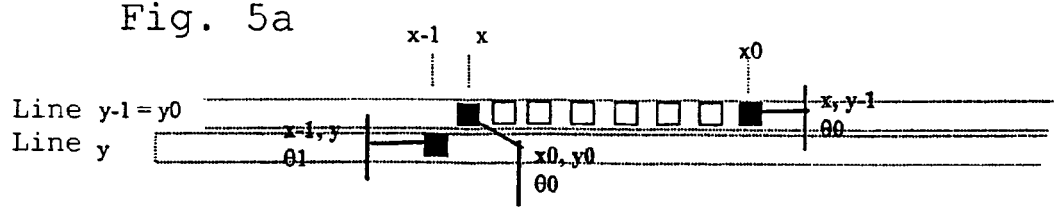
FIGS. 5a, 5b and 6a, 6b illustrate, respectively, two examples of connection between a horizontal straight-line segment and a contour point.
Figure 5B:
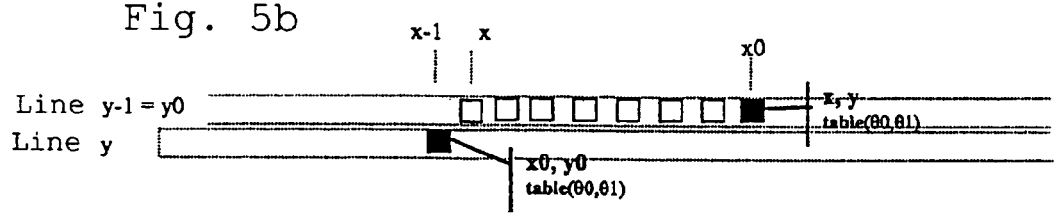
Figure 6A:
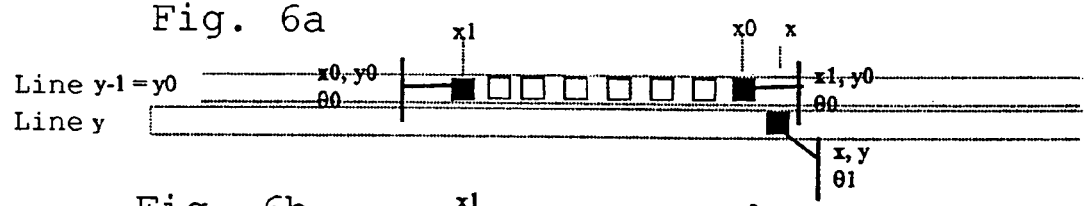
Figure 6B:
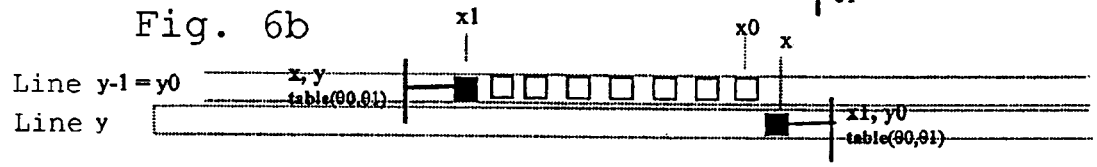

The example represented in FIGS. 4a and 4b below illustrates the connection between a segment S1 having P(x0, y0) as origin point and a contour point P(x−1, y), this connection corresponding to the configuration d−b if reference is made to FIG. 2.

According to this example, once the connection between the points Pb(x0, y0) and Pd(x−1, y) has been detected (FIG. 4a) the coordinates of Pb are written to Pd and the point Pb is erased. Then the following point can be processed by incrementing the value of x and then that of y once the line is finished.

However, in the case of the processing of such a connection of classical type the final extremity of the segment S1 is no longer revealed by the algorithm, for it is situated at a point of the image that will not be examined further. Now, this revelation is necessary in the case of horizontal or practically horizontal lines which compel the two extremities of the segment to be revealed, on account of the fact that said extremities are both susceptible of being connected to another segment of size x≧1 situated in the following line.

Thus, at the time of a connection between a segment S of size x≧1 and a current point which are situated on the same line (configuration d−c if reference is made to FIG. 2) the processing consists in writing to the origin point of the segment S the coordinates of the current point and conversely the coordinates of the origin point to those of the current point, the coordinates of the possible intermediate points being erased.

Figure 7A:
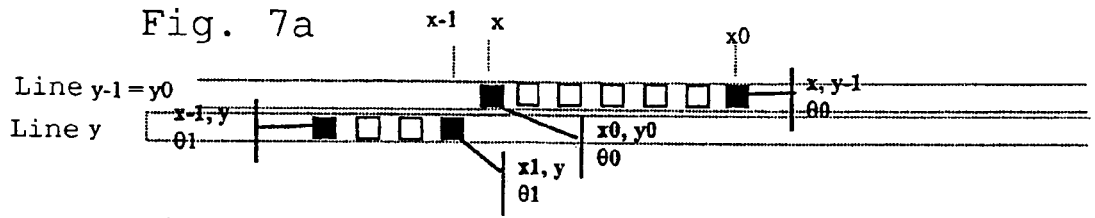
FIGS. 7a and 7b illustrate an example of connection between two horizontal straight-line segments.
Figure 7B:
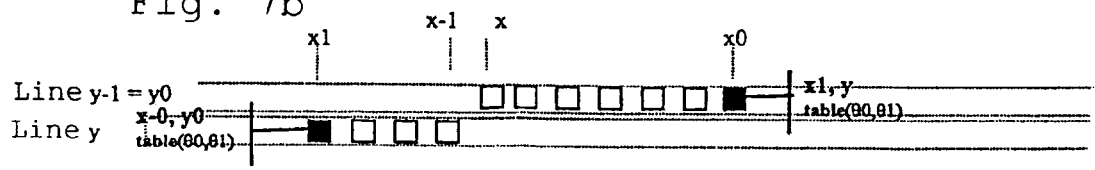

It is then possible to connect a horizontal straight-line segment located in a line j with a contour point (equivalent to a segment of size 1) or a horizontal straight-line segment which are located in one of the lines j−1 or j+1:

- at the time of the connection between a horizontal straight-line segment and a contour point situated in an adjacent line, and as illustrated in the two examples represented, respectively in FIGS. 5a, 5b and 6a, 6b, the coordinates of the contour point are written to the extremity point of the straight-line segment situated on the opposite side from the point of connection and those of said extremity point are written to the contour point.
- at the time of the connection between two horizontal straight-line segments, and as illustrated in the example represented in FIGS. 7a, 7b, the coordinates of the two connected points of said segments are erased, and only the extremities of the resulting segment "pointing" towards one another are preserved.

Once the processing of the current point Pc has been performed in accordance with the process elucidated above and the line memories have been revealed, the following stage consists in establishing whether, amongst the four points Pa, Pb, Pc, Pd which have been read (as represented in FIG. 2), solely the point Pa is a contour point, this condition permitting it to be established that said point Pa constitutes the extremity of a straight-line segment.

In the affirmative case, the size of the straight-line segment is compared with a stored threshold, and saving is proceeded with by revealing the result registers, the coordinates of the origin point and of the final point and the orientation of said straight-line segment if its size is greater than a threshold, the value of which is a function of the application.

The detection device comprises, finally, a calculation module 6 which is programmed from the information stored in the buffer circuit 3, in order to calculate the histogram of the orientations of the various straight-line segments detected.

Similar subject matter is described in commonly assigned French patent applications 99.00717 and 99.00718, each filed Jan. 22, 1999, and in U.S. patent application Ser. No. 09/490,626, filed Jan. 24, 2000, and entitled "OPTO-ELECTRONIC DEVICE FOR ACQUISITION OF IMAGES OF CODES IN ONE AND TWO DIMENSIONS".

Although specific embodiments of and examples for the reader and method of the invention are described herein for illustrative purposes, various equivalent modifications can be made without departing from the spirit and scope of the invention, as will be recognized by those skilled in the relevant art. The teachings provided herein of the invention can be applied to readers for any machine-readable symbology, not necessarily the exemplary bar code reader generally described above.

The various embodiments described above can be combined to provide further embodiments. All of the above U.S. patents, patent applications and publications referred to in this specification are incorporated by reference. Aspects of the invention can be modified, if necessary, to employ systems, circuits and concepts of the various patents, applications and publications to provide yet further embodiments of the invention.

These and other changes can be made to the invention in light of the above-detailed description. In general, in the following claims, the terms used should not be construed to limit the invention to the specific embodiments disclosed in the specification and the claims, but should be construed to include all symbol readers that operated in accordance with the claims to read machine-readable symbols. Accordingly, the invention is not limited by the disclosure, but instead its scope is to be determined entirely by the following claims.

The invention claimed is:

1. A device for detection of straight line segments of an image, comprising:
  a storage module configured to store a stream of data representing a plurality of successive lines of pixels of the image;
  a calculation module configured to:
   compare data representing first, second, third, and fourth pixels of the image;
   determine, from the compared data, whether any of the first, second, third, and fourth pixels are contour point pixels of the image; and
   in a case where there are two contour point pixels among the first, second, third, and fourth pixels,
   determine whether the two contour point pixels conform to selected parameters, relative to each other; and
  a sequencer module configured, in a case where the two contour point pixels conform to the selected parameters, to store location coordinates of the one of the two contour point pixels that occurs earlier in the stream of data to a position in the stream of data representing the other of the two contour point pixels.

2. The device of claim 1, further comprising a buffer module configured to hold the data representing the first, second, third, and fourth pixels of the image during a calculation, and to hold data representing results of the calculation.

3. The device of claim 1 further comprising a memory configured to store the selected parameters.

4. The device of claim 1 further comprising a management module configured to provide a clock signal corresponding to a rate of flow of pixels in the stream of data.

5. The device of claim 1 further comprising an additional calculation module configured to calculate a histogram of straight line segments occurring in the image.

6. A device for detection of a straight line segment of an image, comprising:
  means for selecting a first group of first, second, third, and fourth contiguous pixels of the image, the first and second pixels from a first line of pixels, the third and fourth pixels from directly beneath the first and second pixels, respectively, in a second line of pixels;
  means for determining whether any of the first, second, third, or fourth pixels are contour point pixels of the image;
  means for comparing, in a case where two of the first, second, third, and fourth pixels are contour point pixels, the two contour point pixels;
  means for determining whether the two contour point pixels fall within selected parameters relative to each other; and
  means for storing, at the location of the later occurring of the two contour point pixels, coordinates of the earlier occurring contour point pixel, if the two contour point pixels fall within the selected parameters relative to each other.

7. The device of claim 6, further comprising means for storing at the location of the earlier occurring of the two contour point pixels, coordinates of the later occurring contour point pixel, in the event that the two contour point pixels are the third and fourth pixels.

8. The device of claim 6 wherein the means for comparing are configured to compare the first pixel to the fourth pixel, the second pixel to the third pixel, the second pixel to the fourth pixel, and the third pixel to the fourth pixel.

9. The device of claim 6 wherein the means for selecting include means for selecting a second group of first, second, third, and fourth contiguous pixels of the image, wherein the first and third pixels of the second group are the same pixels as the second and fourth pixels, respectively, of the first group.

* * * * *